(12) United States Patent
Luo et al.

(10) Patent No.: US 9,331,727 B2
(45) Date of Patent: May 3, 2016

(54) METHOD AND APPARATUS FOR PROCESSING SIGNAL INTERFERENCE

(71) Applicant: Huawei Technologies Co., Ltd., Shenzhen, Guangdong (CN)

(72) Inventors: Long Luo, Shenzhen (CN); Huajiong Lin, Chengdu (CN); Linjun Lv, Shenzhen (CN); Bo Han, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/715,011

(22) Filed: May 18, 2015

(65) Prior Publication Data

US 2015/0249476 A1    Sep. 3, 2015

Related U.S. Application Data

(63) Continuation of application No. PCT/CN2014/072419, filed on Feb. 22, 2014.

(30) Foreign Application Priority Data

Feb. 22, 2013  (CN) .......................... 2013 1 0056462

(51) Int. Cl.
 *H04B 1/10*   (2006.01)
 *H04B 17/345* (2015.01)
 *H04L 5/00*   (2006.01)
 *H04L 5/14*   (2006.01)
    (Continued)

(52) U.S. Cl.
 CPC .............. *H04B 1/1027* (2013.01); *H04B 1/123* (2013.01); *H04B 1/525* (2013.01); *H04B 17/345* (2015.01); *H04L 5/0003* (2013.01); *H04L 5/14* (2013.01)

(58) Field of Classification Search
 USPC .......................... 375/260, 346, 350; 330/149
 See application file for complete search history.

(56) References Cited

U.S. PATENT DOCUMENTS

| 6,313,703 B1 * | 11/2001 | Wright ................. H03F 1/0294 330/124 R |
| 9,094,083 B2 * | 7/2015 | Hunzinger ......... H04B 7/15535 |
| 2003/0104787 A1 | 6/2003 | Blount et al. |

(Continued)

FOREIGN PATENT DOCUMENTS

| CN | 102184431 A | 9/2011 |
| CN | 102769487 A | 11/2012 |

(Continued)

OTHER PUBLICATIONS

Mayank Jain, et al., "Practical, Real-time, Full Duplex Wireless", MobiCom'11, Sep. 19-23, 2011, 12 pages.

*Primary Examiner* — Eva Puente

(57) ABSTRACT

Embodiments of the present invention relate to a method and an apparatus for processing signal interference, including: splitting a first self-interference signal into at least two same sub self-interference signals, adjusting amplitudes and phases of the sub self-interference signals to obtain adjusted sub-signals, superposing the adjusted sub-signals and received signals, to obtain superposed sub-signals, filtering the superposed sub-signals by using filters of corresponding channels, to obtain wanted sub-signals, and merging each of the wanted sub-signals to obtain a complete wanted signal. Because received signals are separately filtered by using n different channels, it can be implemented that a self-interference signal can be effectively filtered out on each frequency band.

10 Claims, 3 Drawing Sheets

(51) Int. Cl.
*H04B 1/525* (2015.01)
*H04B 1/12* (2006.01)

(56) References Cited

U.S. PATENT DOCUMENTS

| 2007/0147525 | A1* | 6/2007 | Song | H04L 27/2647 375/260 |
| 2008/0198772 | A1 | 8/2008 | Loh | |
| 2009/0325509 | A1 | 12/2009 | Mattisson et al. | |
| 2010/0061494 | A1* | 3/2010 | Yu | H04B 7/0669 375/346 |
| 2011/0256857 | A1* | 10/2011 | Chen | H04B 1/525 455/422.1 |
| 2015/0311931 | A1* | 10/2015 | Rozental | H04B 1/1081 375/343 |

FOREIGN PATENT DOCUMENTS

| EP | 2 148 480 A2 | 1/2010 |
| WO | WO 2012/085566 A1 | 6/2012 |

* cited by examiner

METHOD AND APPARATUS FOR PROCESSING SIGNAL INTERFERENCE

CROSS-REFERENCE TO RELATED APPLICATIONS

This application is a continuation of International Application No. PCT/CN2014/072419, filed on Feb. 22, 2014, which claims priority to Chinese Patent Application No. 201310056462.0, filed on Feb. 22, 2013, both of which are hereby incorporated by reference in their entireties.

TECHNICAL FIELD

The present invention relates to the field of communications technologies, and in particular, to a method and an apparatus for processing signal interference.

BACKGROUND

In a prior-art communications system, a frequency division duplex (FDD) or time division duplex (TDD) manner is generally used for communication. In an FDD system, different frequencies are used for uplink and downlink communication. In a mobile communications system in a TDD mode, receiving and sending are performed in different timeslots of a same frequency channel (that is, a carrier), and timeslots are used to separate a receive channel from a transmit channel. In both of the communication manners, signals can communicate only within a time or on a specific frequency band.

A full-duplex wireless communications technology is a technology that differs from TDD and FDD. Communication can be implemented at a same time at a same frequency by using the technology. FIG. 1 is a schematic diagram of a prior-art full-duplex communications system. As shown in FIG. 1, when two communications devices communicate at a same time at a same frequency, a receive antenna not only receives a wanted signal (indicated by a dotted line) from a peer end, but also receives a signal sent by a communications device in which the receive antenna is located, that is, a self-interference signal (indicated by a solid line). Moreover, because a transmit antenna is quite close to the receive antenna, the strength of the self-interference signal is often much higher than that of the wanted signal of the peer end. A full-duplex technology is a self-interference signal eliminating technology developed for the foregoing problem. A basic principle is that a communications device "knows" a signal transmitted by the communications device, and therefore, such a self-interference signal can be eliminated at a receive antenna by using some means.

Currently, methods for resolving a self-interference problem are basically classified into three types: antenna elimination, radio frequency elimination, and baseband digital elimination. In the radio frequency elimination, due to hardware, self-interference processing has certain frequency selectiveness: some frequency bands have good eliminating performance, but other frequency bands have relatively poorer eliminating performance. If a system is a wideband system, after the radio frequency elimination, levels of remaining noise at different frequencies in entire bandwidth greatly vary. If a difference of elimination in the entire bandwidth is greater than a signal-to-noise ratio of a transmit link, even after digital elimination is performed, remaining noise on some frequency bands still cannot be as low as a noise floor, which affects an application scope of the full-duplex technology.

SUMMARY

Embodiments of the present invention provide a method and an apparatus for processing signal interference, which can implement that a self-interference signal can be effectively filtered out on each frequency band, thereby resolving a problem in the prior art that self-interference signals on some frequency bands cannot be eliminated.

According to a first aspect, an embodiment of the present invention provides a method for processing signal interference, where the method includes:

splitting a first self-interference signal into at least two same sub self-interference signals;

adjusting amplitudes and phases of the sub self-interference signals to obtain adjusted sub-signals, where an absolute value of a difference between an amplitude of a signal of a first frequency range of the adjusted sub-signals and an amplitude of a signal of the first frequency range of a second self-interference signal is less than an amplitude threshold, a phase of the signal of the first frequency range of the adjusted sub-signals is reverse to a phase of the signal of the first frequency range of the second self-interference signal, and an absolute value of a sum of the phases is less than a phase threshold; and the second self-interference signal is the first self-interference signal that is transmitted out and mixed with noise, and different adjusted sub-signals correspond to different first frequency ranges;

superposing the adjusted sub-signals and received signals, to obtain superposed sub-signals, where the received signals include a wanted signal and the second self-interference signal;

filtering the superposed sub-signals by using filters of corresponding channels, to obtain wanted sub-signals, where a passband frequency range of the filters is the same as the first frequency range corresponding to the sub self-interference signals corresponding to the channels; and merging all the wanted sub-signals to obtain a complete wanted signal.

With reference to the first aspect, in a first possible implementation manner, before the merging each of the wanted sub-signals to obtain a complete wanted signal, the method further includes:

generating correction signals for the channels;

filtering the correction signals by using the filters of the channels, to obtain filtered signals;

detecting channel features of the channels according to the filtered signals;

calculating channel compensation coefficients of the channels according to the channel features and the correction signals; and processing the wanted sub-signals by using the channel compensation coefficients, to obtain corrected sub-signals; and the merging all the wanted sub-signals to obtain a complete wanted signal specifically is: merging each of the corrected sub-signals to obtain the complete wanted signal.

With reference to the first aspect, in a second possible implementation manner, the adjusting amplitudes and phases of the sub self-interference signals to obtain adjusted sub-signals specifically is:

acquiring, from the wanted sub-signals corresponding to the sub self-interference signals, energy of a residual interference signal in the first frequency range corresponding to the sub self-interference signals; and adjusting the amplitudes and the phases of the sub self-interference signals according to the energy, to obtain the adjusted sub-signals, where the energy is a mean value of amplitudes of the residual interference signal within a time threshold.

With reference to the first aspect, in a third possible implementation manner, the filtering the superposed sub-signals by using filters of corresponding channels, to obtain wanted sub-signals specifically is:

filtering the superposed sub-signals by using analog filters of the corresponding channels, to obtain first analog sub-signals;

performing analog to digital conversion ADC on the first analog sub-signals, to obtain first digital sub-signals; and performing digital filtering on the first digital sub-signals, to obtain the wanted sub-signals.

According to a second aspect, an embodiment of the present invention provides an apparatus for processing signal interference, where the apparatus includes:

an equal split unit, configured to split a first self-interference signal into at least two same sub self-interference signals, and send the sub self-interference signals to an adjustment unit;

the adjustment unit, configured to receive the sub self-interference signals sent by the equal split unit, and adjust amplitudes and phases of the sub self-interference signals to obtain adjusted sub-signals, where an absolute value of a difference between an amplitude of a signal of a first frequency range of the adjusted sub-signals and an amplitude of a signal of the first frequency range of a second self-interference signal is less than an amplitude threshold, a phase of the signal of the first frequency range of the adjusted sub-signals is reverse to a phase of the signal of the first frequency range of the second self-interference signal, and an absolute value of a sum of the phases is less than a phase threshold; and the second self-interference signal is the first self-interference signal that is transmitted out and mixed with noise, and different adjusted sub-signals correspond to different first frequency ranges;

a superposition unit, configured to receive the adjusted sub-signals sent by the adjustment unit, superpose the adjusted sub-signals and received signals, to obtain superposed sub-signals, where the received signals include a wanted signal and the second self-interference signal, and send the superposed sub-signals to a filter unit;

the filter unit, configured to receive the superposed sub-signals sent by the superposition unit, filter the superposed sub-signals by using filters of corresponding channels, to obtain wanted sub-signals, where a passband frequency range of the filters is the same as the first frequency range corresponding to the sub self-interference signals corresponding to the channels, and send the wanted sub-signals to a merging unit; and the merging unit, configured to receive the wanted sub-signals sent by the filter unit, and merge all the wanted sub-signals to obtain a complete wanted signal.

With reference to the second aspect, in a first possible implementation manner, the apparatus further includes a correction unit, configured to:

generate correction signals for the channels;
filter the correction signals by using the filters of the channels, to obtain filtered signals;
detect channel features of the channels according to the filtered signals;
calculate channel compensation coefficients of the channels according to the channel features and the correction signals corresponding to the channels; and
process the wanted sub-signals by using the channel compensation coefficients, to obtain corrected sub-signals; and the merging unit is specifically configured to merge all the corrected sub-signals to obtain the complete wanted signal.

With reference to the second aspect, in a second possible implementation manner, the adjustment unit is specifically configured to:

acquire, from the wanted sub-signals corresponding to the sub self-interference signals, energy of a residual interference signal in the first frequency range corresponding to the sub self-interference signals; and adjust the amplitudes and the phases of the sub self-interference signals according to the energy, to obtain the adjusted sub-signals, where the energy is a mean value of amplitudes of the residual interference signal within a time threshold.

With reference to the second aspect, in a third possible implementation manner, the superposition unit is specifically configured to:

filter the superposed sub-signals by using analog filters of the corresponding channels, to obtain first analog sub-signals;

perform ADC on the first analog sub-signals, to obtain first digital sub-signals; and perform digital filtering on the first digital sub-signals, to obtain the wanted sub-signals.

In the embodiments of the present invention, a first self-interference signal is split into at least two same sub self-interference signals; amplitudes and phases of the sub self-interference signals are adjusted to obtain adjusted sub-signals; the adjusted sub-signals and received signals are superposed, to obtain superposed sub-signals; the superposed sub-signals are filtered by using filters of corresponding channels, to obtain wanted sub-signals; and each of the wanted sub-signals is merged to obtain a complete wanted signal. Because received signals are separately filtered by using n different channels, it can be implemented that a self-interference signal can be effectively filtered out on each frequency band.

DETAILED DESCRIPTION

To make the objectives, technical solutions, and advantages of the present invention clearer, the following further describes specific embodiments of the present invention in detail with reference to the accompanying drawings.

In a method and an apparatus for processing signal interference provided in embodiments of the present invention, because received signals are separately filtered by using n different channels, it can be implemented that a self-interference signal can be effectively filtered out on each frequency band. Moreover, a signal of each channel can be kept undistorted by means of channel correction, and a complete wanted signal obtained in this way further has higher precision.

It should be noted that, the apparatus provided in the embodiments of the present invention may not only be applied to a Long Term Evolution (LTE) system, but also be applied to a Wideband Code Division Multiple Access (WCDMA) mobile communications system, and a Time Division-Synchronization Code Division Multiple Access (TD-SCDMA) technology, and a worldwide interoperability for microwave access (WiMax) technology.

Figure 1:
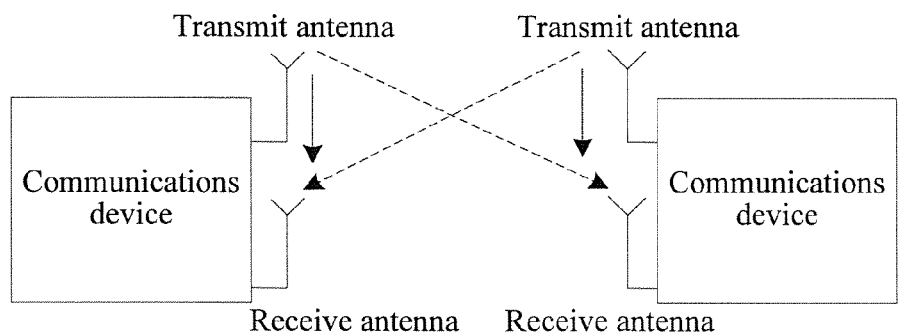
FIG. 1 is a schematic diagram of an existing full-duplex communications system.
Figure 2:
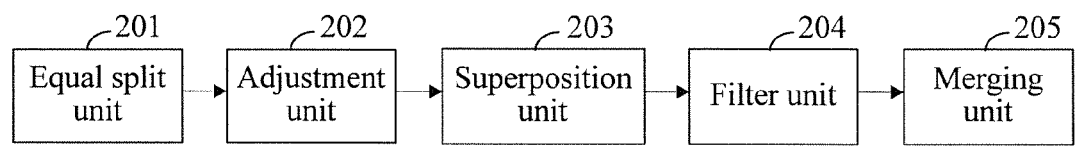
FIG. 2 is a schematic diagram of an apparatus for processing signal interference according to Embodiment 1 of the present invention.

FIG. 2 is a schematic diagram of an apparatus for processing signal interference according to Embodiment 1 of the present invention. As shown in FIG. 2, the apparatus provided in this embodiment of the present invention includes: an equal split unit 201, an adjustment unit 202, a superposition unit 203, a filter unit 204 and a merging unit 205.

Figure 3:
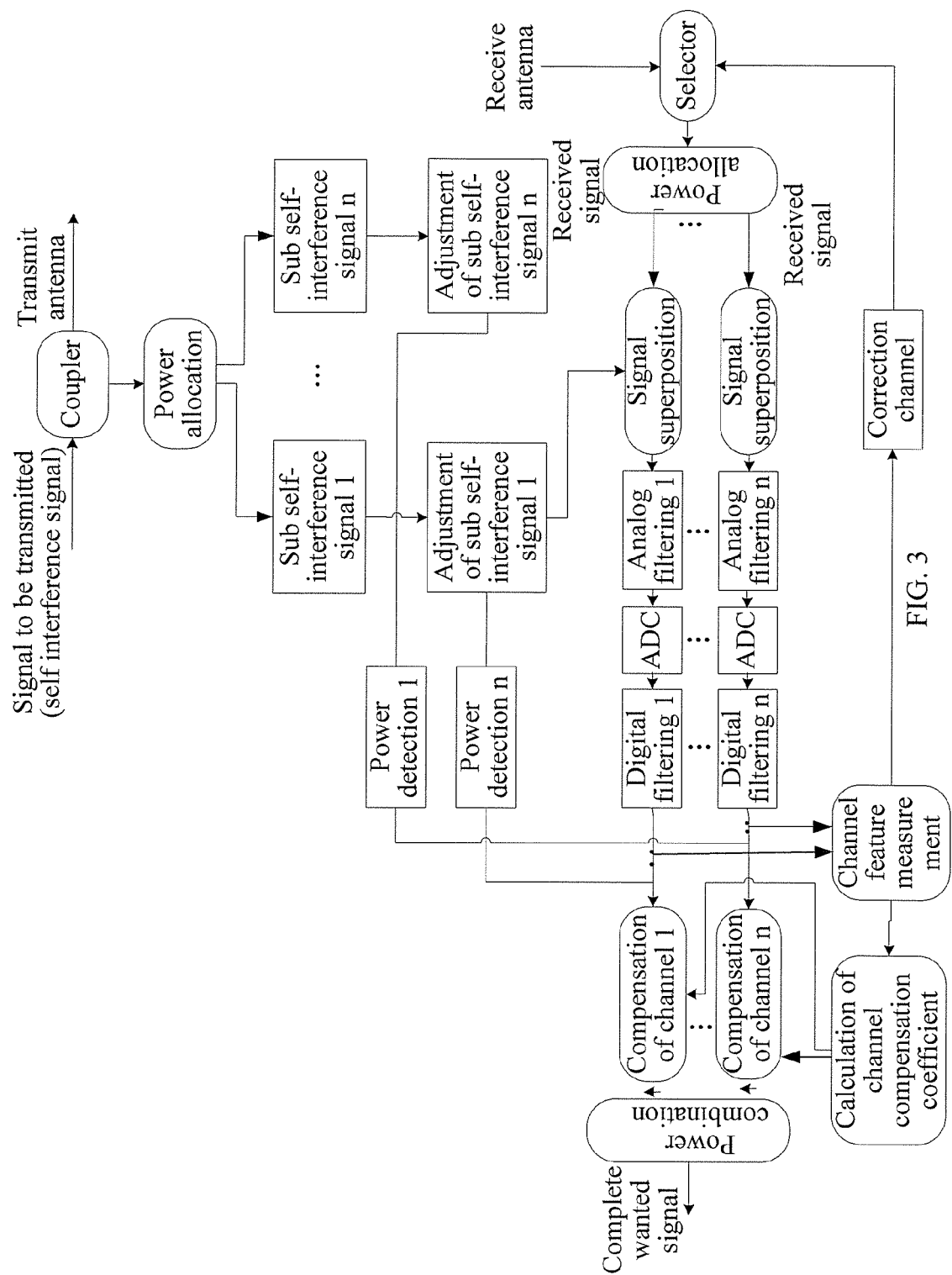
FIG. 3 is a schematic circuit diagram of the apparatus for processing signal interference according to Embodiment 1 of the present invention.

FIG. 3 is a schematic circuit diagram of the apparatus for processing signal interference according to Embodiment 1 of the present invention. A working process of the apparatus provided in this embodiment of the present invention is described in detail below with reference to FIG. 3 and FIG. 2.

The equal split unit 201 is configured to split a first self-interference signal into at least two same sub self-interference signals, and send the sub self-interference signals to the adjustment unit 202.

Specifically, as shown in FIG. 3, a communications device has a transmit antenna and a receive antenna. A signal received by the device by using the receive antenna is referred to as a received signal, and the received signal not only includes a signal (a wanted signal) transmitted by another device, but also includes a signal (a self-interference signal) transmitted by the transmit antenna of the device. Because the communications device may obtain a signal that is to be transmitted by the communications device by using the transmit antenna, for the purpose of distinguishing, a signal that has not been transmitted by using the antenna is referred to as a first self-interference signal; after the signal is transmitted out by using the transmit antenna, the signal is inevitably mixed with noise, and the signal that is transmitted out and mixed with noise is referred to as a second self-interference signal. To eliminate the second self-interference signal to the greatest extent, the first self-interference signal may be coupled by using a coupler, to obtain a low-power first self-interference signal and a high-power first self-interference signal. The high-power first self-interference signal is transmitted out by using the transmit antenna, and power allocation is performed on the low-power first self-interference signal by using the equal split unit, to split the low-power first self-interference signal into n same sub self-interference signals.

The adjustment unit 202 is configured to receive the sub self-interference signals sent by the equal split unit 201, adjust amplitudes and phases of the sub self-interference signals to obtain adjusted sub-signals, where an absolute value of a difference between an amplitude of a signal of a first frequency range of the adjusted sub-signals and an amplitude of a signal of the first frequency range of the second self-interference signal is less than an amplitude threshold, a phase of the signal of the first frequency range of the adjusted sub-signals is reverse to a phase of the signal of the first frequency range of the second self-interference signal, and an absolute value of a sum of the phases is less than a phase threshold; and the second self-interference signal is the first self-interference signal that is transmitted out and mixed with noise, and different adjusted sub-signals correspond to different first frequency ranges, and send the adjusted sub-signals to the superposition unit 203.

Specifically, after the equal split unit 201 splits the first self-interference signal into n sub self-interference signals, frequencies and amplitudes of these sub self-interference signals need to be adjusted separately. Different sub self-interference signals correspond to different first frequency ranges. An amplitude of a signal in a first frequency range corresponding to the sub self-interference signals is made to be the same as an amplitude of a signal in a first frequency range corresponding to the second self-interference signal as much as possible, and a phase of the signal in the first frequency range corresponding to the sub self-interference signals is made to be reverse to a phase of the signal in the first frequency range corresponding to the second self-interference signal. An amplitude threshold and a phase threshold may be set, to make an absolute value of a difference between the amplitudes less than the amplitude threshold, and make an absolute value of a sum of the phases less than the phase threshold. Values of the amplitude threshold and the phase threshold may be determined according to an actual precision requirement.

The superposition unit 203 is configured to receive the adjusted sub-signals sent by the adjustment unit 202, superpose the adjusted sub-signals and a received signal, to obtain superposed sub-signals, where the received signal include a wanted signal and the second self-interference signal, and send the superposed sub-signals to the filter unit 204.

Specifically, after receiving a received signal by using the receive antenna (the received signal includes a wanted signal transmitted by another device and a second self-interference signal transmitted by the device itself), the communications device splits, by means of power allocation, the received signal into n signals whose quantity is the same as a quantity of the sub self-interference signals. Because both phases and amplitudes of these signals are the same as those of the original received signal, except that these signals have lower power, the n signals are still referred to as received signals herein. The superposition unit superposes, by means of power combination, the n sub self-interference signals and the n received signals, to obtain n superposed sub-signals.

The filter unit 204 is configured to receive the superposed sub-signals sent by the superposition unit 203, filter the superposed sub-signals by using filters of corresponding channels, to obtain wanted sub-signals, where a passband frequency range of the filters is the same as the first frequency range corresponding to the sub self-interference signals corresponding to the channels, and send the wanted sub-signals to the merging unit 205.

Specifically, the filter unit 204 includes n channels, each channel has one analog filter and one digital filter. Because each superposed sub-signal not only includes one sub self-interference signal but also includes one received signal, a passband frequency range of the analog filter and a passband frequency range of the digital filter of each channel may be set to be the same as the first frequency range of a sub self-interference signal corresponding to a superposed sub-signal entering the channel, that is, the analog filter and the digital filter of each channel can filter out a signal in another frequency band range except the signal of the first frequency range corresponding to the sub self-interference signal, from the superposed sub-signal entering the channel. Because the superposed sub-signals are analog signals, and finally need to be converted into digital signals, but when conversion is performed by using an analog to digital converter (ADC), there is a problem of saturation caused due to excessively large analog data, analog filtering is usually performed first. In this way, a large noise signal can be filtered out, ADC is performed, and then digital filtering is performed, to obtain n wanted sub-signals.

The merging unit 205 is configured to receive the wanted sub-signals sent by the filter unit 204, and merge each of the wanted sub-signals to obtain a complete wanted signal.

Specifically, the merging unit 205 performs power combination on the received n wanted sub-signals, to obtain a wanted signal with complete bandwidth.

Preferably, the apparatus may further include a correction unit, configured to generate correction signals for the channels; filter the correction signals by using the filters of the channels, to obtain filtered signals; detect channel features of the channels according to the filtered signals; calculate channel compensation coefficients of the channels according to the channel features and the correction signals corresponding to the channels; and process the wanted sub-signals by using the channel compensation coefficients, to obtain corrected sub-signals. The merging unit 205 is specifically configured to merge all the corrected sub-signals to obtain the complete wanted signal. Because channel correction is performed, a signal of each channel can be kept undistorted, and the complete wanted signal obtained in this way further has higher precision.

Preferably, the adjustment unit 202 is specifically configured to:

because noise in the second self-interference signal cannot be obtained in advance, as shown in FIG. 3, acquire, by means of power detection from the wanted sub-signals corresponding to the sub self-interference signals, energy of a residual interference signal in the first frequency range corresponding to the sub self-interference signals; and adjust the amplitudes and the phases of the sub self-interference signals according to the energy, to obtain the adjusted sub-signals, to make the adjusted sub-signals similar to the signal of the first frequency range corresponding to the second self-interference signal as much as possible. The energy is a mean value of amplitudes of the residual interference signal within a time threshold.

The superposition unit 203 is specifically configured to:

filter the superposed sub-signals by using analog filters of the corresponding channels, to obtain first analog sub-signals;

perform ADC on the first analog sub-signals, to obtain first digital sub-signals; and perform digital filtering on the first digital sub-signals, to obtain the wanted sub-signals.

In the forgoing embodiment, an equal split unit 201 splits a first self-interference signal into at least two same sub self-interference signals; an adjustment unit 202 adjusts amplitudes and phases of the sub self-interference signals to obtain adjusted sub-signals; a superposition unit 203 superposes the adjusted sub-signals and received signals, to obtain superposed sub-signals; a filter unit 204 filters the superposed sub-signals by using filters of corresponding channels, to obtain wanted sub-signals; and a merging unit 205 merges each of the wanted sub-signals to obtain a complete wanted signal. Because received signals are separately filtered by using n different channels, it can be implemented that a self-interference signal can be effectively filtered out on each frequency band.

Figure 4:
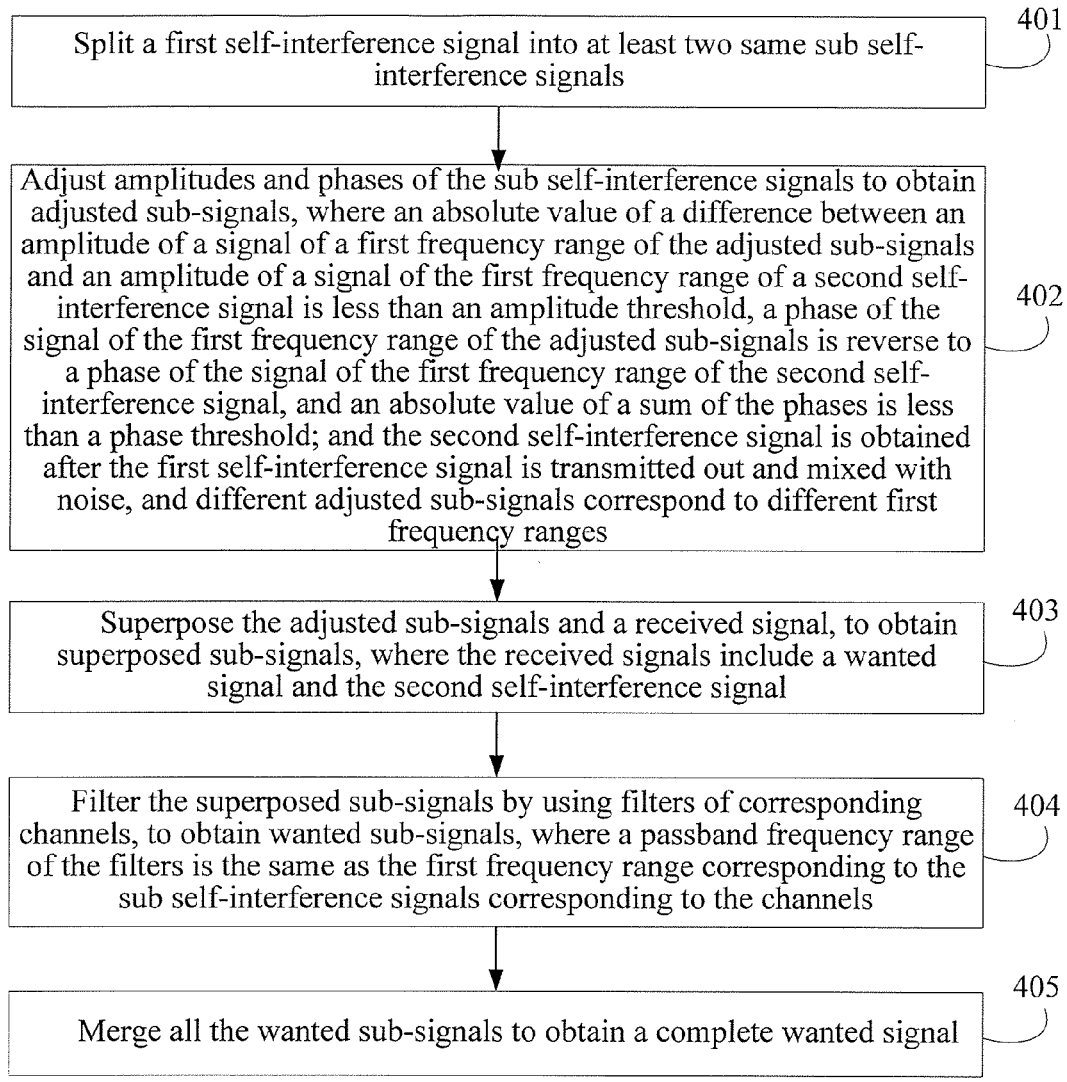
FIG. 4 is a flowchart of a method for processing signal interference according to Embodiment 2 of the present invention.

The foregoing embodiment describes the apparatus for processing signal interference, and correspondingly, the following embodiment describes a method for processing signal interference. FIG. 4 is a flowchart of a method for processing signal interference according to Embodiment 2 of the present invention. As shown in FIG. 4, the method provided in this embodiment of the present invention includes:

S401. Split a first self-interference signal into at least two same sub self-interference signals.

S402. Adjust amplitudes and phases of the sub self-interference signals to obtain adjusted sub-signals, where an absolute value of a difference between an amplitude of a signal of a first frequency range of the adjusted sub-signals and an amplitude of a signal of the first frequency range of a second self-interference signal is less than an amplitude threshold, a phase of the signal of the first frequency range of the adjusted sub-signals is reverse to a phase of the signal of the first frequency range of the second self-interference signal, and an absolute value of a sum of the phases is less than a phase threshold; and the second self-interference signal is the first self-interference signal that is transmitted out and mixed with noise, and different adjusted sub-signals correspond to different first frequency ranges.

Preferably, energy of a residual interference signal in the first frequency range corresponding to the sub self-interference signals may be acquired from the wanted sub-signals corresponding to the sub self-interference signals; and the amplitudes and the phases of the sub self-interference signals are adjusted according to the energy, to obtain the adjusted sub-signals, where the energy is a mean value of amplitudes of the residual interference signal within a time threshold.

S403. Superpose the adjusted sub-signals and a received signal, to obtain superposed sub-signals, where the received signal includes a wanted signal and the second self-interference signal.

Specifically, the superposed sub-signals are filtered by using an analog filter of a corresponding channel, to obtain first analog sub-signals; analog to digital conversion ADC is performed on the first analog sub-signals, to obtain first digital sub-signals; and digital filtering is performed on the first digital sub-signals, to obtain the wanted sub-signals.

S404. Filter the superposed sub-signals by using filters of corresponding channels, to obtain wanted sub-signals, where a passband frequency range of the filters is the same as the first frequency range corresponding to the sub self-interference signals corresponding to the channels.

S405. Merge each of the wanted sub-signals to obtain a complete wanted signal.

Before S405, the method may further include: generating correction signals for the channels; filtering the correction signals by using the filters of the channels, to obtain filtered signals; detecting channel features of the channels according to the filtered signals; calculating channel compensation coefficients of the channels according to the channel features and the correction signals; and processing the wanted sub-signals by using the channel compensation coefficients, to obtain corrected sub-signals. The merging all the wanted sub-signals to obtain a complete wanted signal specifically is: merging each of the corrected sub-signals to obtain the complete wanted signal. Because channel correction is performed, a signal of each channel can be kept undistorted, and the complete wanted signal obtained in this way further has higher precision.

It should be noted that, the method provided in this embodiment is applied to the apparatus provided in Embodiment 1, and therefore, specific steps of the method correspond to the working process of the apparatus provided in Embodiment 1, which are not described herein again.

In the foregoing embodiment, a first self-interference signal is split into at least two same sub self-interference signals, amplitudes and phases of the sub self-interference signals are adjusted to obtain adjusted sub-signals, the adjusted sub-signals and received signals are superposed, to obtain superposed sub-signals, the superposed sub-signals are filtered by using filters of corresponding channels, to obtain wanted sub-signals, and each of the wanted sub-signals is merged to obtain a complete wanted signal. Because received signals are separately filtered by using n different channels, it can be implemented that a self-interference signal can be effectively filtered out on each frequency band.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method for processing signal interference, the method comprising:
   splitting a first self-interference signal into at least two same sub self-interference signals;
   adjusting amplitudes and phases of the at least two same sub self-interference signals to obtain adjusted sub-signals, wherein an absolute value of a difference between an amplitude of a signal of a first frequency range of the adjusted sub-signals and an amplitude of a signal of the first frequency range of a second self-interference signal is less than an amplitude threshold, a phase of the signal of the first frequency range of the adjusted sub-signals is reverse to a phase of the signal of the first frequency range of the second self-interference signal, and an absolute value of a sum of the phases is less than a phase threshold; and the second self-interference signal is the first self-interference signal that is transmitted out and mixed with noise, and different adjusted sub-signals correspond to different first frequency ranges;
   superposing the adjusted sub-signals and a received signal, to obtain superposed sub-signals, wherein the received signal comprises a wanted signal and the second self-interference signal;
   filtering the superposed sub-signals by using filters of corresponding channels, to obtain wanted sub-signals, wherein a passband frequency range of the filters is the same as the first frequency range corresponding to the sub self-interference signals corresponding to the channels; and
   merging all the wanted sub-signals to obtain a complete wanted signal.

2. The method according to claim 1, wherein before merging each of the wanted sub-signals to obtain a complete wanted signal, the method further comprises:
   generating correction signals for the channels;
   filtering the correction signals by using the filters of the channels, to obtain filtered signals;
   detecting channel features of the channels according to the filtered signals;
   calculating channel compensation coefficients of the channels according to the channel features and the correction signals; and
   processing the wanted sub-signals by using the channel compensation coefficients, to obtain corrected sub-signals; and
   merging each of the corrected sub-signals to obtain the complete wanted signal.

3. The method according to claim 1, wherein adjusting amplitudes and phases of the sub self-interference signals to obtain adjusted sub-signals comprises:
   acquiring, from the wanted sub-signals corresponding to the sub self-interference signals, energy of a residual interference signal in the first frequency range corresponding to the sub self-interference signals; and
   adjusting the amplitudes and the phases of the sub self-interference signals according to the energy, to obtain the adjusted sub-signals, wherein the energy is a mean value of amplitudes of the residual interference signal within a time threshold.

4. The method according to claim 1, wherein superposing the adjusted sub-signals and a received signal, to obtain superposed sub-signals, comprises:
   splitting the received signal into at least two sub-received signals, wherein a quantity of the sub-received signals is the same as a quantity of the sub self-interference signals;
   superposing the adjusted sub-signals and the sub-received signals by means of power combination, to obtain the superposed sub-signals.

5. The method according to claim 1, wherein filtering the superposed sub-signals by using filters of corresponding channels, to obtain wanted sub-signals comprises:
   filtering the superposed sub-signals by using analog filters of the corresponding channels, to obtain first analog sub-signals;
   performing analog to digital conversion (ADC) on the first analog sub-signals, to obtain first digital sub-signals; and
   performing digital filtering on the first digital sub-signals, to obtain the wanted sub-signals.

6. An apparatus for processing signal interference, the apparatus comprising:
   a processor; and
   a memory coupled to the processor, the memory comprising instructions that, when executed by the processor, cause the apparatus to:
   split a first self-interference signal into at least two same sub self-interference signals;
   receive the sub self-interference signals, and adjust amplitudes and phases of the sub self-interference signals to obtain adjusted sub-signals, wherein an absolute value of a difference between an amplitude of a signal of a first frequency range of the adjusted sub-signals and an amplitude of a signal of the first frequency range of a second self-interference signal is less than an amplitude threshold, a phase of the signal of the first frequency range of the adjusted sub-signals is reverse to a phase of the signal of the first frequency range of the second self-interference signal, and an absolute value of a sum of the phases is less than a phase threshold; and the second self-interference signal is the first self-interference signal that is transmitted out and mixed with noise, and different adjusted sub-signals correspond to different first frequency ranges;

receive the adjusted sub-signals, superpose the adjusted sub-signals and a received signal, to obtain superposed sub-signals, wherein the received signal comprise a wanted signal and the second self-interference signal;

receive the superposed sub-signals, filter the superposed sub-signals by using filters of corresponding channels, to obtain wanted sub-signals, wherein a passband frequency range of the filters is the same as the first frequency range corresponding to the sub self-interference signals corresponding to the channels; and receive the wanted sub-signals and merge all the wanted sub-signals to obtain a complete wanted signal.

7. The apparatus for processing interference according to claim 6, further comprising instructions that, when executed by the processor, cause the apparatus to:

generate correction signals for the channels;

filter the correction signals by using the filters of the channels, to obtain filtered signals;

detect channel features of the channels according to the filtered signals;

calculate channel compensation coefficients of the channels according to the channel features and the correction signals corresponding to the channels; and process the wanted sub-signals by using the channel compensation coefficients, to obtain corrected sub-signals; and merge all the corrected sub-signals to obtain the complete wanted signal.

8. The apparatus for processing interference according to claim 6, further comprising instructions that, when executed by the processor, cause the apparatus to:

acquire, from the wanted sub-signals corresponding to the sub self-interference signals, energy of a residual interference signal in the first frequency range corresponding to the sub self-interference signals; and adjust the amplitudes and the phases of the sub self-interference signals according to the energy, to obtain the adjusted sub-signals, wherein the energy is a mean value of amplitudes of the residual interference signal within a time threshold.

9. The apparatus according to claim 6, further comprising instructions that, when executed by the processor, cause the apparatus to:

superpose the adjusted sub-signals and sub-received signals by means of power combination, to obtain the superposed sub-signals, wherein the received signal is split into at least two sub-received signals, wherein a quantity of the sub-received signals is the same as a quantity of the sub self-interference signals.

10. The apparatus according to claim 6, further comprising instructions that, when executed by the processor, cause the apparatus to:

filter the superposed sub-signals by using analog filters of the corresponding channels, to obtain first analog sub-signals;

perform analog to digital conversion (ADC) on the first analog sub-signals, to obtain first digital sub-signals; and perform digital filtering on the first digital sub-signals, to obtain the wanted sub-signals.

* * * * *